United States Patent [19]

Oliveau et al.

[11] Patent Number: 4,844,876
[45] Date of Patent: Jul. 4, 1989

[54] PROCESS AND DEVICE FOR SELECTIVE EXTRACTION OF $H_2S$ FROM AN $H_2S$-CONTAINING GAS

[75] Inventors: Olivier Oliveau; Jean-Louis Peytavy, both of Lescar, France

[73] Assignee: Societe Nationale Elf Aquitaine, Paris, France

[21] Appl. No.: 67,260

[22] PCT Filed: Oct. 3, 1986

[86] PCT No.: PCT/FR86/00341
§ 371 Date: Jun. 3, 1987
§ 102(e) Date: Jun. 3, 1987

[87] PCT Pub. No.: WO87/01960
PCT Pub. Date: Apr. 9, 1987

[30] Foreign Application Priority Data

Apr. 10, 1985 [FR] France ............................... 85 14741

[51] Int. Cl.$^4$ .............................................. C01B 17/16
[52] U.S. Cl. ..................................... 423/220; 423/223; 423/228; 423/229; 423/563; 423/645; 55/48; 55/68; 55/73; 55/93
[58] Field of Search ............... 423/229, 228, 223, 220, 423/563, 645; 422/189, 207, 206; 55/48, 68, 73, 93

[56] References Cited

U.S. PATENT DOCUMENTS 4,129,425 12/1978 Stephenson et al. .................. 55/44
4,519,991 5/1985 Oliveau et al. ...................... 423/229

Primary Examiner—Robert L. Stoll
Attorney, Agent, or Firm—Weiser & Stapler

[57] ABSTRACT

Method for the selective removal of $H_2S$ from a $H_2S$-containing gas by operating in a single column (1) comprising an upper absorption zone (11) and a lower regeneration zone (12) separated by a medial enrichment zone (17). A selective absorbing and regeneratable liquid capable of absorbing $H_2S$ is introduced at the upper portion of the column and flows successively into the zones (11) and (17) and finally into (12). The absorbing liquid meets the gas to be treated, which is injected through a conduit (9), in the zone (11) while the regenerated absorbing liquid is tapped at the bottom (4) of the column and brought back through a conduit (5) into said zone (11). At the head (2) of the column, a gas having a reduced content of $H_2S$ is discharged and by means of a system (18) provided in the zone (17) an acid gas fraction rich in $H_2S$ is tapped. Application to the production of a highly $H_2S$ enriched gas effluent from a gas containing $H_2S$ and an appreciable quantity of $CO_2$.

21 Claims, 1 Drawing Sheet

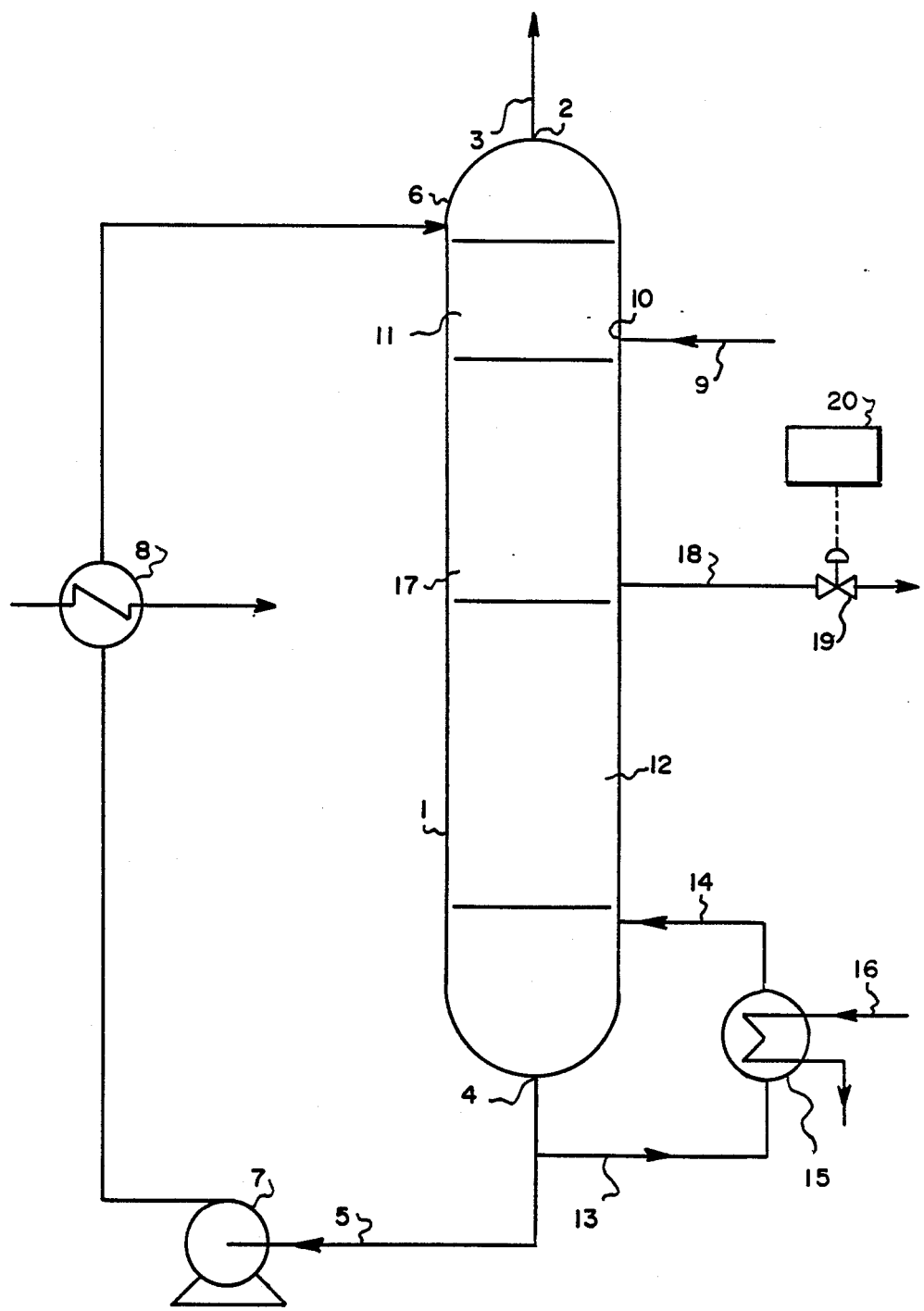

PROCESS AND DEVICE FOR SELECTIVE EXTRACTION OF $H_2S$ FROM AN $H_2S$-CONTAINING GAS

The invention pertains to a process for selective extraction of $H_2S$ from an $H_2S$-containing gas. It also refers to a device for realizing this process.

Selective extraction of $H_2S$ from an $H_2S$-containing gas is usually used to eliminate the majority, or almost the entirety, of the $H_2S$ present in the said gas, to produce a desulfured gas with an $H_2S$ content below an imposed threshold and/or to generate a stream of acid gas which is rich in $H_2S$ and includes as low as possible a quantity of other acid compounds such as $CO_2$, with such a stream of acid gas being usable as a source of $H_2S$ for the production of sulfur according to the Claus process of controlled $H_2S$ oxidation or also for the synthesis of thioorganic compounds.

Such selective extraction of $H_2S$ is normally accomplished by washing the gas under treatment by means of an absorbent liquid which can be regenerated by heat and is selective for $H_2S$, i.e., an absorbent liquid which, on the one hand, is capable of retaining gaseous acid compounds such as $H_2S$ and $CO_2$ and returning practically the totality of these acid compounds by heating, and on the other hand, possesses an absorptive capacity which is distinctly greater with regard to $H_2S$ than to other acid compounds, particularly $CO_2$. The absorbent liquid fixes the gaseous acid compounds by simple physical dissolution and/or by dissolution after formation of a thermally unstable salt or complex by reaction between the said gaseous acid compounds and a basic compound, for example, an amine or alkanolamine, contained in the absorbent liquid.

In practice, the gas under treatment, which contains $H_2S$ and possibly other gaseous acid compounds such as $CO_2$, is brought into contact, in an absorption zone, with the selected absorbent liquid, circulating in countercurrent, so as to produce a gas with a reduced level of $H_2S$ which is drawn off from the top of the absorption zone, and tapping from the bottom of the said zone a stream of absorbent liquid charged with $H_2S$ and containing as little $CO_2$ and other gaseous acid compounds as possible. The said stream of absorbent liquid is then introduced into a regeneration zone in which it is subjected to conditions of temperature and pressure such as to produce almost complete release of the absorbed gaseous acid compounds, which are taken off from the top of the regeneration zone in the form of a gaseous acid effluent rich in $H_2S$, and to produce at the bottom of the regeneration zone a regenerated absorbent liquid practically free of dissolved gaseous acid compounds, which is tapped and reused as the absorbent liquid in the absorption zone.

When the gaseous acid effluent rich in $H_2S$ drawn off from the top of the regeneration zone does not contain a sufficient level of $H_2S$ to allow the said effluent to be used in the application envisaged, especially manufacture of sulfur by controlled oxidation of $H_2S$ or synthesis of thioorganic compounds, the operations are repeated, i.e., the gaseous acid effluent is treated in a second absorption zone with an absorbent liquid which is also selective for $H_2S$ and regeneratable by heating, to produce a stream of absorbent liquid highly charged with $H_2S$, which is conveyed to a second regeneration zone to be regenerated as indicated above, producing a gaseous acid effluent with a higher concentration of $H_2S$ than the effluent emerging from the first treatment.

Such a method of operation presents the disadvantage, among others, of requiring the use of very high-volume installations to produce a gaseous acid effluent sufficiently rich in $H_2S$ to be usable in the applications, for which it is designed.

The present invention proposes to remedy this disadvantage by offering a process for selective extraction of $H_2S$ from an $H_2S$-containing gas whose production is very simplified since it refers to a single treatment zone but also makes it possible to produce a gaseous acid effluent substantially enriched in $H_2S$ even if the concentration of $H_2S$ in the initial gas under treatment is low. In addition, when the gas under treatment contains $CO_2$ in addition to the $H_2S$, the process according to the invention makes it possible to limit coabsorption of $CO_2$ by the absorbent liquid and therefore to greatly reduce the quantity of $CO_2$ passing into the gaseous acid effluent enriched in $H_2S$, even if the gas under treatment contains a high level of $CO_2$.

The process according to the invention for selective extraction of $H_2S$ from an $H_2S$-containing gas is of the type in which the gas under treatment is brought into contact, in an absorption zone, with an absorbent liquid which is selective for $H_2S$ and regeneratable by heating, circulating in countercurrent, so as to produce a gas with a highly reduced level of $H_2S$ and a stream of absorbent liquid charged with $H_2S$, and said stream of absorbent liquid is subjected to regeneration by heating, in a regeneration zone, to release the absorbed gases, and on the one hand, to form a gaseous acid effluent richer in $H_2S$ than the gas under treatment, and on the other hand, a regenerated absorbent liquid which is reused for contact with the gas under treatment, and it is characterized by the fact that it is carried out in a single treatment zone in which the absorbent liquid is introduced into its upper part and flows towards the lower part; and that the gas under treatment is charged into this treatment zone at a point located at a sufficient distance below the entry point of the absorbent liquid to carry out the desired extraction of $H_2S$ present in the gas under treatment and produces at the top of said zone a gas with a reduced level of $H_2S$; that the absorbent liquid is provided, in the lower part of the treatment zone, with sufficient heat energy to release the gaseous acid compounds absorbed by said absorbent liquid and thus to regenerate this liquid and to tap from the bottom of the zone a stream of regenerated absorbent liquid, which is used, after cooling, to constitute a portion or the totality of the absorbent liquid introduced into the upper part of the treatment zone, and a gaseous acid effluent highly enriched in $H_2S$ is thereby produced by tapping, at a point in the treatment zone located between the entry point of the gas under treatment and the lower part of this zone where the heat energy is supplied, only a portion of the gaseous phase available at that point in the treatment zone and resulting from regeneration of the absorbent liquid.

In the single treatment zone, the space between the level at which the absorbent liquid introduced and the level at which the gas under treatment is charged acts as an absorption zone, while the space between the said charging level of the gas under treatment and the tapping level of the gaseous acid effluent highly enriched in $H_2S$ constitutes an enrichment zone, while the space between the said tapping level and the bottom of the treatment zone acts as the regeneration zone.

The flow rate of the gaseous acid effluent highly enriched in $H_2S$ which is tapped from the treatment zone depends on the $H_2S$ concentration that one wishes to obtain in the said effluent, and more precisely, varies inversely with the said concentration. The said flow rate of gaseous acid effluent enriched in $H_2S$ represents a fraction of the total flow of the gaseous acid compounds present in the gas under treatment, this fraction being lower, the higher the $H_2S$ concentration desired in the enriched gaseous acid effluent.

The process according to the invention can be used to selectively extract the $H_2S$ contained in all types of gas available at a low pressure, i.e., under an absolute pressure at least equal to ca. 5 bars. Such a process is advantageously suited for treating gas containing $H_2S$ and $CO_2$ to produce a gaseous acid effluent having a sufficiently high level of $H_2S$ to be used as a source of $H_2S$ in the Claus sulfur plants or the workshops of the synthesis of thioorganic compounds. In particular, one may use the process according to the invention to treat mixtures of $H_2S$ and $CO_2$, also called acid gases, containing at least 60% $H_2S$ by volume with the intention of producing gaseous acid effluent containing 95% or more $H_2S$ by volume.

The absorbent liquid which can be used to selectively extract the $H_2S$ can be selected from among the various absorbent liquids having sufficient selectivity for $H_2S$ and capable of being regenerated by heating and more especially by boiling. The absorbent liquid can be based on one or more solvents with a physical action such as methanol, polyethylene glycol dimethylethers, N-methylpyrrolidone, sulfolane or phosphoric esters, or it can consist of a solvent with a chemical action consisting of an aqueous solution of one or more compounds which fix acid gases of the $H_2S$ or $CO_2$ type in the form of thermally unstable complexes or salts, such as for example, an aqueous solution of an alkanolamine such as methyl diethanolamine, triethanolamine or diisopropanolamine. The absorbent liquid can also be selected from mixtures of the two types of solvents mentioned above, such as for example, mixtures of water, diisopropanolamine and sulfolane, mixtures of water, methyl diethanolamine and sulfolane and mixtures of water, methanol and one or more amines such as methyl diethanolamine, monoethanolamine, diethanolamine and diisopropanolamine. Especially suitable as an absorbent liquid which is selective for $H_2S$ and regeneratable by heating is an aqueous solution of an alkanolamine such as methyl diethanolamine, triethanolamine and diisopropanolamine, in which the alkanolamine concentration is between 1N and 8N, preferably between 3N and 6N.

The pressure prevailing in the space acting as an absorption zone essentially corresponds to that of the gas under treatment injected into the treatment zone.

The temperature to be selected for contact, in the absorption zone, between the gas under treatment and the absorbent liquid circulating in countercurrent is not critical and depends, among other things, on the nature of the absorbent liquid used. For example, for an absorbent liquid selected from among the aqueous alkanolamine solutions, absorption temperatures ranging from approximately 10° C. to approximately 80° C. can be selected. The temperature in the absorption zone generally essentially corresponds to that of the absorbent liquid introduced into the treatment zone.

The flow rate of the absorbent liquid introduced into the treatment zone and circulating in said zone from the absorption zone up to the regeneration zone passing by the enrichment zone, is linked, among other things, to the $H_2S$ concentration of the gas under treatment and also to the quantity of $H_2S$ which can be tolerated in the gas drawn off at the top of the treatment zone.

The temperature and pressure conditions in the regeneration space are selected, bearing in mind the nature of the absorbent liquid used to fix the $H_2S$, so that the said $H_2S$ and the other gaseous acid compounds such as $CO_2$ retained by the absorbent liquid during its passage through the absorption zone and then through the enrichment zone are released, and that the regenerated absorbent liquid tapped from the bottom of the treatment zone, is practically free of dissolved gaseous acid compounds. The absolute pressure in the upper part of the regeneration zone is generally lower than 5 bars and is most often located between 1.3 and 2.5 bars. Maintenance of such a pressure requires a temperature at the lower part of the regeneration zone which is usually between 100° C. and 180° C. approximately, which corresponds to a temperature at the top of the regeneration zone ranging between approximately 80° C. and approximately 125° C. The required temperature in the lower part of the regeneration zone is maintained by supplying the necessary heat energy to the absorbent liquid arriving at the said part of the regeneration zone; this addition of heat energy can be achieved by any known technique, advantageously by boiling.

In the enrichment zone, the absorbent liquid, which circulates in the absorption zone and already contains a certain quantity of $H_2S$ and other absorbed gaseous acid compounds such as $CO_2$ extracted from the gas injected into the absorption zone, encounters the gaseous acid compounds released during regeneration, and because of its selectivity for $H_2S$, it reabsorbs an additional quantity of $H_2S$; because of that fact, the gaseous phase in equilibrium with the absorbent liquid in the said enrichment zone, particularly in the vicinity of the regeneration zone, is highly enriched in $H_2S$. By controlling the flow of gaseous acid effluent tapped from the treatment zone, it is possible, as mentioned above, to obtain the desired $H_2S$ concentration in this effluent.

The pressure and the temperature prevailing in the enrichment zone have values intermediate between the values which this parameter assumes at the top of the regeneration zone and at the bottom of the absorption zone. It is advantageous if the heat energy supplied to the absorbent liquid in the lower part of the regeneration zone is controlled so that the temperature in the treatment zone, at the level where the gaseous acid effluent highly enriched in $H_2S$ is tapped, is only slightly higher, and more especially is not more than 20° to 30° C. higher than the temperature of the absorbent liquid entering the treatment zone, which makes it possible to tap a gaseous acid effluent containing little or no water vapor.

A device for implementing the process according to the invention comprises a single column equipped inside to make possible the contact of a gas with a liquid, which is equipped at the top with an opening for the discharge of gases and at the bottom with an opening for tapping a liquid, this latter opening being externally connected by a recycling conduit emerging in the column below the opening for the discharge of gases, said column being provided with a conduit for the supply of gas under treatment, emerging in this column at a certain distance below the recycling conduit and being equipped in its lower part with a heating system, for example, a boiling-type system, while an element for tapping a gaseous effluent, preferably arranged so as to allow controlled variation in the tapping flow rate, is installed on the column between the conduit for the supply of gas under treatment and the heating system.

In the column, the space between the levels of the recycling conduit and the conduit of the supply of gas under treatment acts as an absorption zone, the space between the level of the conduit of the supply of gas under treatment and the level of the tapping element constitutes an enrichment zone, while the space between said level of the tapping element and the bottom of the column acts as a regeneration zone.

The recycling conduit is advantageously equipped with a pump, and below this pump, it is equipped with a cooling system, which operates by indirect heat exchange.

The column which forms the device for carrying out the process according to the invention can be of any type normally used for bringing a gas into contact with a liquid and can, for example, consist of a plate column or of a packed column. The number of plates or the equivalent packing height of the column is selected so that during operation the absorption, enrichment and regeneration zones may act correctly so as to produce the desired $H_2S$ enrichment in the gaseous acid effluent tapped from the column and so that a gas containing the imposed minimum $H_2S$ content can be drawn off at the top of the column.

A better understanding of the invention will be gained by reading the following description of one of its embodiments, illustrated in reference to the FIGURE in the attached drawing schematically showing a device according to the invention using a plate column.

Referring to the FIGURE, the device for selectively extracting $H_2S$ from $H_2S$-containing gas comprises a column 1 equipped with plates with an opening 2 at the top for the discharge of gases extended by a conduit 3 and at the bottom with an opening 4 for tapping liquid. The opening 4 is externally extended by a recycling conduit 5, which emerges in the upper part of column 1 at a point 6 located below opening 2. On the conduit 5 are mounted a pump 7, and below the pump, a cooling system 8 by indirect heat exchange. Column 1 is equipped with a conduit 9 for supplying the gas under treatment, which emerges in said column at a point 10 located at a certain distance below the recycling conduit 5. In its lower part, column 1 is connected, through the inlet 13 and outlet 14 tubes, to a boiler 15 heated by indirect heat exchange by means of saturated water vapor circulating in a tubing system 16. In addition, column 1 is equipped with a tapping element for a gaseous effluent, which is mounted between the conduit 9 for supplying gas under treatment and the tube 14 connecting the outlet of the boiler 15 to column 1 and which consists of a tapping conduit 18 on which is placed a valve 19 with a variable opening. Said valve is controlled either manually or advantageously, as shown, by a regulator 20, which can be a flow regulator or a regulator controlling the concentration of $H_2S$ in the gaseous effluent tapped through the valve. In column 1, the space 11 defined between the levels of the points 6 and 10, where, respectively, the recycling conduit 5 and the conduit 9 for supplying gas under treatment emerge, acts as the absorption zone, the space 17 located between the level of the conduit 9 for supplying gas under treatment and the level of the tapping element comprising the tapping conduit 18 acts as an enrichment zone, while the space 12 located between the level of the tapping element and the bottom of column 1 acts as a regeneration zone.

The operation of this device can be sketched out as follows:

The gas under treatment, which contains $H_2S$ for extraction and also, for example, $CO_2$ extraction of which is to be limited as far as possible, arrives at the column 1 through the conduit 9 and encounters, in countercurrent, in the absorption zone 11, the absorbent liquid which is selective for $H_2S$ and regeneratable by heating, which is introduced, through the recycling conduit 5, at the point 6 of the said column and flows by gravity towards the bottom of this column. Because of its selectivity for $H_2S$, the absorbent liquid fixes the majority of the $H_2S$ present in the gas under treatment as well as a lesser quantity of $CO_2$. A gas whose $H_2S$ content has been decreased to the desired minimum value is drawn off through the opening 2 of the column and the associated conduit 3.

The absorbent liquid charged with the gaseous acid compounds $H_2S$ and $CO_2$ absorbed in the absorption zone crosses the enrichment zone 17, whose role will be explained later, and reaches the regeneration zone 12. In this latter zone, the absorbent liquid is kept boiling under a pressure greater than atmospheric pressure, the said pressure generally being between 1 and 5 bars absolute, so as to release the absorbed gaseous acid compounds and to allow them to be stripped by the vapors of the absorbent liquid.

The regenerated absorbent liquid is tapped through the opening 4 and is returned to the column 1 through the recycling conduit 5 opening at point 6, under the action of the pump 7, and after having been cooled in the cooling system 8 to the appropriate temperature for contact with the gas under treatment in the absorption zone. The heat required to keep the absorbent liquid boiling in the regeneration zone is furnished by passing a portion of the regenerated liquid tapped through the opening 4 into the boiler 15 heated by the saturated water vapor passing into the tubing 16. The heat energy furnished to the absorbent liquid in the boiler is preferably controlled, by any known means for the purpose, so that the temperature in the column 1 at the level of the tapping conduit 18 for the gaseous effluent is no more than 20° to 30° C. higher than the temperature of the absorbent liquid entering the column at the point 6, which makes it possible to tap a practically dry gaseous effluent at the conduit 18.

The gaseous acid compounds $H_2S$ and $CO_2$ released in the regeneration zone 12 are stripped by the vapors of the absorbent liquid out of this zone and are therefore brought into the enrichment zone 17, where they encounter the absorbent liquid arriving from the absorption zone 11 and therefore containing a certain quantity of absorbed $H_2S$ and $CO_2$ extracted from the gas injected into the zone 11 through the conduit 9.

In the zone 17 of the column, the absorbent liquid, because of its selectivity for $H_2S$, reabsorbs a substantial quantity of $H_2S$, so that in the part of the said zone located in the vicinity of the tapping level the gaseous phase in equilibrium with the absorbent liquid has an $H_2S$ concentration substantially higher than the gaseous phase which can be obtained by regeneration of the absorbent liquid emerging directly from the absorption zone.

Through the valve 19 installed in the tapping conduit 18, it is possible to collect a gaseous acid effluent highly enriched in $H_2S$. The flow of this effluent only represents a fraction of the flow of the gaseous acid compounds $H_2S$ and $CO_2$ available in the gas under treatment reaching the column 1 through the conduit 9, with this fraction being lower, the higher the desired value for the $H_2S$ concentration in the collected effluent.

When one thus evacuates at the top of the column 1 a gas practically containing no $H_2S$, almost all of the $H_2S$ contained in the gas under treatment can be recovered by the tapping conduit 18.

To complete the above description, a concrete example, not limiting in character, of the process according to the invention is given below.

EXAMPLE

An acid gas consisting of a mixture comprising, by volume, 60% $H_2S$ and 40% $CO_2$, was treated using a device similar to that described with reference to the FIGURE on the attached drawing, the column of said device being equipped with 20 plates.

The absorbent liquid consisted of a 4N aqueous solution of methyl diethanolamine (abbreviated as MDEA).

Counting the plates of the column from the top of the latter, the conduit 9 for the introduction of the gas under treatment emerged in said column between the second and the third plate, while the tubing 19 of the tapping system 18 was mounted between the tenth and the eleventh plate, which was the equivalent of the absorption, enrichment and regeneration zones, comprising two, eight and ten plates, respectively.

The gas under treatment arrived in the column 1 at a flow rate of 11,000 $Nm^3/h$, a pressure of 2 bars absolute and a temperature of approximately 40° C., and in said column, encountered in countercurrent the aqueous solution of MDEA injected into the column through the recycling conduit 5 at a flow rate of 130 $m^3/h$ and a temperature of approximately 40° C.

The aqueous solution of MDEA was brought, at the bottom of the column, to a temperature of approximately 125° C. by saturated water vapor under an absolute pressure of 4 bars, circulating in the tubing 16 of the boiler.

The temperature in the enrichment zone 17 was approximately 60° C. at the level of the conduit 18 for tapping the gaseous effluent enriched in $H_2S$.

The amount of $H_2S$ of this gaseous effluent is given below for different values of the output of the tapping, i.e., for different openings of the valve 19:

Output of the tapping of the gaseous acid effluent ($Nm^3/h$): 6270, 5000, 2750

Molar content of $H_2S$ of the tapped effluent (%): 95, 97, 98

The results above indicate that the process according to the invention makes it possible to produce a gaseous acid effluent substantially enriched in $H_2S$ with respect to a starting acid gas and that this enrichment may be controlled by varying the tapping output of the said gaseous effluent.

We claim:

1. A process for the selective extraction of $H_2S$ from a gas containing a plurality of gaseous acid compounds one of which is $H_2S$ by operating in a single column provided with an upper absorption zone and a lower regeneration zone communicating with each other through a middle enrichment zone, said process comprising the steps of introducing into the absorption zone an absorbent liquid for said acid compounds, which is selective for $H_2S$ and regeneratable by heating, and circulating said absorbent liquid and the gas to be treated in counter current in said absorption zone to yield a treated gas with a reduced level of $H_2S$ and a stream of absorbent liquid charged with said gaseous acid compounds, said stream traveling through the middle zone to the bottom of the column to the regeneration zone, heating the absorbent liquid charged with the gaseous acid compounds in the regeneration zone so as to release said gaseous acid compounds and obtain a regenerated absorbent liquid and also a gaseous acid effluent, the latter containing the released gaseous acid compounds and being richer in $H_2S$ that the gaseous acid compound fraction of the gas be treated, and to transport the $H_2S$-rich gaseous acid effluent into the middle enrichment zone by stripping said effluent with the absorbent liquid vapor generated by said heating, contacting in said middle zone the $H_2S$-rich gaseous acid effluent with the charged absorbent liquid flowing from the absorption zone so as to form an equilibrium between the $H_2S$-rich gaseous acid effluent and said charged absorbent liquid, tapping at the equilibrium location a fraction of the $H_2S$-rich gaseous effluent available at said location and controlling the heat supplied to the regeneration zone to maintain a temperature difference of no more than about 20° C. to about 30° C. between the temperature of the charged absorbent liquid flowing from the absorption zone into the enrichment zone and the temperature in said enrichment zone at the level where the fraction of $H_2S$-rich gaseous effluent is tapped.

2. The process according to claim 1, wherein the lower the ratio of the flow of deabsorbed $H_2S$-rich gaseous acid effluent tapped to the total flow of acid gasses under treatment, the higher the concentration of $H_2S$ in the deabsorbed gaseous acid effluent.

3. The process according to claim 2, wherein the flow rate of deabsorbed $H_2S$-rich gaseous acid effluent tapped is about 6,270 $Nm^3/H$, the total flow rate of acid gases under treatment is about 11,000 $Nm^3/H$, the molar $H_2S$ content of said acid gases is at least about 60% and the molar content of $H_2S$ in the gaseous acid effluent tapped is about 95%.

4. The process according to claim 2, wherein the flow rate of the fraction of the $H_2S$-rich gaseous acid effluent tapped is about 5,000 $Nm^3/h$, the total flow rate of acid gases under treatment is about 11,000 $Nm^3/h$, the molar $H_2S$ content of said acid gases is about 60% and the molar content of $H_2S$ in the gaseous acid effluent tapped is about 97%.

5. The process according to claim 2, wherein the flow rate of the fraction of the $H_2S$-rich gaseous acid effluent tapped is about 2,750 $Nm^3/h$, the total flow rate of acid gases under treatment is about 11,000 $Nm^3/h$, the molar $H_2S$ content of said gases is about 60% and the molar content of $H_2S$ in the gaseous effluent tapped is about 98%.

6. The process according to claim 1, wherein the absorbent liquid comprises one or more solvents selected from the group consisting of methanol, polyethylene glycol, dimethyl ethers, N-methyl-pyrrolidone, sulfolane, phosphoric esters and alkanolamines selective for $H_2S$.

7. The process according to claim 6, which comprises an aqueous solution of the absorbent liquid.

8. The process according to claim 7, wherein the absorbent liquid is an alkanolamine that selectively fixes $H_2S$.

9. The process according to claim 8, wherein the alkanolamine which selectively fixes $H_2S$ is selected from the group consisting of methyl diethanolamine, diisopropanolamine, and triethanolamine.

10. The process according to claim 9, wherein the alkanolamine is methyl diethanolamine.

11. The procss according to claim 7, wherein the absorbent liquid is a mixture of water, and methanol at least one alkanolamine selected from the group consisting of methyldiethanolamine, monoethanolamine, diisopropanolamine and diethanolamine.

12. The process according to claim 1, wherein the gas under treatment comprises $H_2S$ and $CO_2$.

13. The process according to claim 12, wherein the content by volume of $H_2S$ in the gas under treatment comprises about 60%.

14. The process according to claim 12, wherein the content by volume of $H_2S$ in the gas under treatment comprises at least 60%.

15. The process according to claim 14, wherein the gas under treatment discharged at the top of the treatment zone is practically free of $H_2S$.

16. The process according to claim 8, wherein the concentration of the aqueous alkanolamine absorbent liquid is between about 1N and about 8N.

17. The process according to claim 16, wherein the concentration of the aqueous alkanolamine absorbent liquid is between about 3N and about 6N.

18. The process according to claim 7, wherein the absorbent liquid in aqueous solution is a mixture of sulfolane and an alkanolamine selected from the group consisting of methyldiethanolamine and diisopropanolamine.

19. The process according to claim 1 wherein the temperature difference maintained between the charged absorbent liquid flowing from the absorption zone and the $H_2S$-rich gaseous acid effluent entering the enrichment zone is less than about 20° C.

20. The process according to claim 1, wherein the temperature difference maintained between the charged absorbent liquid flowing from the absorption zone and the level in the enrichment zone where the fraction of the $H_2S$-rich gaseous effluent is tapped, is about 20° C.

21. A process for the selective extraction of $H_2S$ from a gas containing a plurality of gaseous acid compounds one of which is $H_2S$ by operating in a single column provided with an upper absorption zone and a lower regeneration zone communicating with each other through a middle enrichment zone, said process comprising the steps of introducing into the absorption zone an absorbent liquid for said acid compounds, which is selected for $H_2S$ and regeneratable by heating, and circulating said absorbent liquid and the gas to be treated in counter current in said absorption zone to yield a treated gas with a reduced level of $H_2S$ and a stream of absorbent liquid charged with said gaseous acid compounds, said stream traveling through the middle zone to the bottom of the column to the regeneration zone, heating the absorbent liquid charged with the gaseous acid compounds in the regeneration zone so as to release said gaseous acid compounds and obtain a regenerated absorbent liquid and also a gaseous acid effluent, the latter containing the released gaseous acid compounds and being richer in $H_2S$ that the gaseous acid compound fraction of the gas be treated, and to transport the $H_2S$-rich gaseous acid effluent into the middle enrichment zone by stripping said effluent with the absorbent liquid vapor generated by said heating, contacting in said middle zone the $H_2S$-rich gaseous acid effluent with the charged absorbent liquid flowing from the absorption zone so as to form an equilibrium between the $H_2S$-rich gaseous acid effluent and said charged absorbent liquid, tapping at the equilibrium location a fraction of the $H_2S$-rich gaeous effluent available at said location and recycling a portion of the liquid from the bottom of the regeneration zone, through a heating zone and reintroducing it into said regeneration zone, thereby controlling the heat supplied to the regeneration zone to maintain a temperature difference of no more than about 20° C. to about 30° C. between the temperature of the charged absorbent liquid flowing from the absorption zone into the enrichment zone and the temperature in said enrichment zone at the level where the fraction of $H_2S$-rich gaseous effluent is tapped.

* * * * *